Feb. 4, 1930. J. O. GOODWIN 1,745,482
APPARATUS FOR FORMING PLASTIC BODIES UPON CORES
Filed Jan. 20, 1928
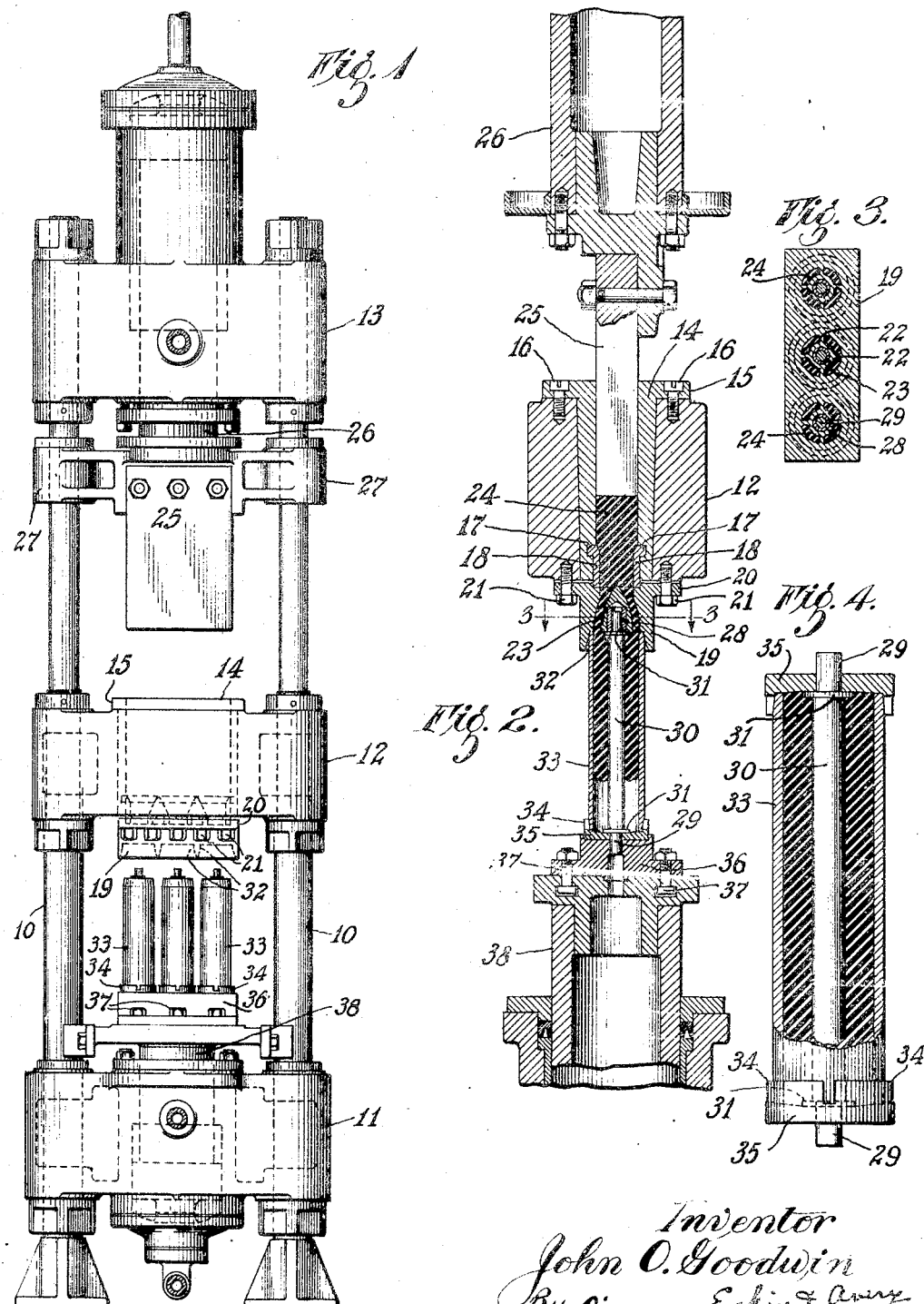
Inventor
John O. Goodwin
By Pierson, Eakin & Avery
Attys.

Patented Feb. 4, 1930

1,745,482

UNITED STATES PATENT OFFICE

JOHN O. GOODWIN, OF AKRON, OHIO, ASSIGNOR TO THE B. F. GOODRICH COMPANY, OF NEW YORK, N. Y., A CORPORATION OF NEW YORK

APPARATUS FOR FORMING PLASTIC BODIES UPON CORES

Application filed January 20, 1928. Serial No. 248,105.

This invention relates to methods and apparatus for forming plastic bodies upon cores, as in the manufacture of rubber rolls such as are used in clothes wringers, for example.

Such rolls heretofore commonly have been molded and vulcanized in two-part molds divided longitudinally, which has resulted in longitudinal mold fins upon the vulcanized roll and in an imperfect cylindrical form of the roll, necessitating an expensive buffing operation for finishing the roll, and the matter of forming the moldable blanks and mounting them upon the metal cores or shafts and enclosing them in the molds in such manner as to insure complete filling of the mold and avoidance of entrapped air has been one of considerable difficulty and expense.

My chief objects are to provide for molding the roll or other cored body to true cross-sectional form; to avoid mold fins upon the surface of the article between its ends; and to provide for facility and economy in shaping, vulcanizing and finishing of molded rubber articles.

Of the accompanying drawings:

Fig. 1 is an elevation of a molding machine embodying and adapted to carry out my invention in its preferred form.

Fig. 2 is a vertical section of the same.

Fig. 3 is a section on line 3—3 of Fig. 2.

Fig. 4 is an elevation, with a part sectioned and broken away, of the vulcanizing-mold assembly and the work therein.

Referring to the drawings, the machine comprises a pair of vertical standards or tie-rod structures 10 rising from the floor and connected near their lower ends by a cross-member 11 centrally formed as a ram cylinder, at a higher position by a cross-member 12 formed at its middle with a downwardly tapered, vertical, through aperture adapted to receive an extrusion-box structure, and at their tops by a cross-member 13 centrally formed as a ram cylinder.

Fitted in the vertical opening in the middle cross-member 12 is a sectional extrusion-box structure 14 having at its upper end an external flange 15 seated upon the upper face of the member 12 and fastened thereto by screws 16, 16. The sections of the extrusion-box structure 14 are formed with horizontal grooves 17, 17 in their inner faces near their lower ends and in these grooves are seated external flanges formed upon the upper ends of coupler members 18, 18 which project below the lower ends of the sections of the box 14 and are there fitted in a counter sink formed in the upper face of an extrusion block 19 which is formed at its upper end with an outwardly projecting flange 20 adapted to be drawn toward the lower face of the cross-member 12 by screws 21, 21 to embrace the coupler members 18 tightly between the extrusion block 19 and the box members 14 to provide a tightly sealed coupling of the block 19 to the extrusion-box structure.

The extrusion block 19 is formed with three sets of arcuate extrusion passages (see Fig. 3), the passages of each set being defined by spider arms 22, 22 running from the outer structure of the extrusion block to a central hub member 23 which is upwardly tapered to provide stream-line flow of a plastic rubber composition 24 forced downward from the box structure 14 and through the extrusion passages in the block 19 by a plunger 25 slidably fitting in the box 14 and secured to the lower end of a two-way ram 26 which is mounted in the ram cylinder formed on the uppermost cross-member 13 and is provided with guide arms 27, 27 slidably mounted upon the standards or tie-rods 10.

From its lower end the hub member 23 is recessed to provide a socket for a removable bushing or filler member 28 adapted snugly to seat the reduced upper end portion 29 of a wringer roll core 30, which is provided with the usual retaining flanges 31, 31 at the ends of its body portion which receives the rubber roll body or cushion. The bushing 28 is adapted to be replaced by other similar bushings with different sized seats for cores of different sizes.

The extrusion block 19 is formed about each of the sets of extrusion apertures with a tapered counter sink 32 adapted to seat with a sealing fit and to center the upper end of a seamless cylindrical tube or mold 33 adapted for the vulcanization of the roll body therein.

The lower end of the molding tube 33 is fitted within a pair of semi-circular flanges such as the flange 34 formed on a cup-like end-closure member 35 formed with a central aperture to accommodate the adjacent reduced end portion 29 of the wringer roll core or mandrel 30. The molding tube 33 preferably is externally tapered at its ends for facility and accuracy of assembly and disassembly with relation to the extrusion block 19 and with end closure members such as the member 35.

For simultaneously supporting a set of three of the molding tubes 33 and a like number of the mandrels 30 in association with the extruding block 19 with strong pressure upon the molding tubes 33 so that they will be substantially sealed against escape of the rubber composition, a supporting block 36 formed on its upper face with respective sockets for the end closure members 35 and formed with vertical apertures to accommodate the lower reduced end portions 29 of the mandrels 30, is adjustably secured by bolts 37, 37 upon the upper end of a ram 38 mounted in the ram cylinder which is formed in the lowermost cross-member 11.

In the operation of the apparatus, a charge of the rubber composition 24 being placed in the extrusion box 14 or remaining therein as a residue from the last extruding operation and the ram 38 being in a lowered position, a set of the molding tubes 33 and mandrels or cores 30 are mounted upon the block 36, each of the molding tubes 33 and its mandrel 30 being provided with one of the end closure members 35 at its lower end. The ram 38 is then elevated to bring the upper ends of the molding tubes and mandrels into the relation to the extrusion block 19 which is shown in Fig. 2 and the upward pressure upon the ram 38 is maintained to hold them in that relation while the molding tubes are filled with the rubber composition 24 by forcing downward the plunger 25 in the box 14 and thus causing the plastic composition to flow through the apertures in the block 19 into the molding tubes until the tubes are completely filled with the composition under high molding pressure.

In the case of rolls and mandrels having such relative size as to provide a small annular space between them, as in the case of the wringer roll here shown, the composition extruded through the block 19 is so resisted in its downward movement by the mandrel 30 and the tube 33 that it moves downward as a growing wall of stock completely occupying the cross-sectional space between the mandrel 30 and the tube 33 and drives ahead of it the air contained in the tube so that the air escapes through the vent provided by imperfect sealing of the tube 33 and the mandrel 30 against the end closure member 35 and the tube is thus completely filled with the composition without the pocketing or entrapping of air.

When the tubes are completely filled and the pressure has been maintained upon the plunger 25 for a sufficient length of time to assure a thorough compacting of the composition in the tubes, the plunger 25 is lifted, the ram 38 is lowered, and the molding-tube and mandrel assemblies filled with the rubber composition are removed from the extrusion block 19, the webs of stock in the block 19 parting at the spider arms 22, closely adjacent the upper flange 31 of the mandrel and the upper end of the tube.

The filled tube and mandrel assemblies are then provided with end closure members 35 for the ends of the assemblies that were associated with the block 19, providing completely closed mold assemblies such as that shown in Fig. 4.

The stock within the mold assemblies is thoroughly compacted and held under pressure by forcing the two end closure members 35 toward each other and the assemblies are subjected to vulcanizing heat for sufficient time to vulcanize the composition contained therein.

The end closure members 35 are then removed from each assembly and the finished roll with the core or mandrel 30 therein is removed from the molding tube 33, preferably after the assembly has been allowed to cool so that the removal will be facilitated by the shrinking of the rubber cushion body.

The resulting product is without mold fins except at its ends and the form of the molding tube is such that the product may be molded very accurately to the desired cross-sectional form throughout its length, as distinguished from the molding of a roll or the like by means of longitudinally disposed mold sections, wherein the cross-sectional shape of the roll varies in accordance with incomplete closing of the mold caused by the mold fins incident to the use of an excess of stock such as to insure complete filling of the mold.

Other advantages including those set out in the above statement of objects are provided by my invention, and as it is susceptible of modification without sacrifice of all such advantages I do not wholly limit my claims to the specific construction or the exact procedure herein described.

I claim:

1. Apparatus for forming a cored article of plastic material, the said apparatus comprising an apertured extrusion block mounted in a fixed position and means for forcing a plastic material through said block, said block being formed freely to receive from an axial direction and thereby to engage and hold in fixed relation to each other the adjacent ends of a tubular mold and a core mounted therein.

2. Apparatus for forming a cored article of plastic material, the said apparatus comprising an apertured extrusion block mounted in a fixed position, means for forcing a plastic material through said block, said block being formed freely to receive from an axial direction and thereby to engage and hold in fixed relation to each other the adjacent ends of a tubular mold and a core mounted therein, and means for holding the mold and the core in association with said block against the force of plastic material forced through the block into the mold.

3. Apparatus as defined in claim 2 including a separable closure member for the end of the mold opposite the extruding block, the said closure member being formed to engage the mold and the core to hold them in fixed relation to each other.

In witness whereof I have hereunto set my hand this 13th day of January, 1928.

JOHN O. GOODWIN.